(12) United States Patent
Bang (10) Patent No.: US 11,977,799 B2
(45) Date of Patent: May 7, 2024

(54) CONTROL METHOD CAPABLE OF SWITCHING BETWEEN IMAGE OUTPUT APPARATUSES, NON-TRANSITORY COMPUTER-READABLE STORAGE MEDIUM, AND INFORMATION PROCESSING APPARATUS

(71) Applicant: CANON KABUSHIKI KAISHA, Tokyo (JP)

(72) Inventor: Junghyun Bang, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/076,648

(22) Filed: Dec. 7, 2022

(65) Prior Publication Data
US 2023/0185500 A1  Jun. 15, 2023

(30) Foreign Application Priority Data
Dec. 13, 2021  (JP) ................................ 2021-202042

(51) Int. Cl.
*G06F 3/12* (2006.01)

(52) U.S. Cl.
CPC .......... *G06F 3/1255* (2013.01); *G06F 3/1204* (2013.01); *G06F 3/1261* (2013.01); *G06F 3/1273* (2013.01)

(58) Field of Classification Search
CPC .... G06F 3/1255; G06F 3/1204; G06F 3/1261; G06F 3/1273; G06F 3/1205; G06F 3/1257; G06F 3/1285; G06F 3/1288; Y02D 10/00
See application file for complete search history.

(56) References Cited

U.S. PATENT DOCUMENTS

| 10,462,314 B2* | 10/2019 | Igawa ................... G06F 3/1255 |
| 2004/0080779 A1* | 4/2004 | Kawamoto ........... G06F 3/1261 358/1.14 |
| 2009/0201540 A1* | 8/2009 | Morooka .............. G06F 3/1255 358/1.15 |
| 2011/0228305 A1* | 9/2011 | Sasase .................. G06F 3/1229 358/1.13 |
| 2020/0293238 A1* | 9/2020 | Asai ....................... G06F 3/1255 |
| 2021/0240413 A1* | 8/2021 | Hanai ................... G06F 3/1255 |

FOREIGN PATENT DOCUMENTS

JP       2014-211722 A     11/2014

* cited by examiner

*Primary Examiner* — Juan M Guillermety
(74) *Attorney, Agent, or Firm* — VENABLE LLP (57) ABSTRACT

A control method executed in an information processing apparatus capable of communicating with a plurality of image output apparatuses includes, based on an operation input by a user concerning switching of the plurality of image output apparatuses, specifying an existence of a difference, between before and after the switching, of a settable content for each of a plurality of print setting items, and (i) for a first setting item, among the plurality of print setting items, which has no existence of the difference between before and after the switching, setting the same content after the switching as before the switching, and (ii) for a second setting item which has an existence of the difference between before and after the switching, presenting information about a content which is not settable before the switching and is settable after the switching.

15 Claims, 10 Drawing Sheets

| IMAGE OUTPUT APPARATUS | PAPER FEED PORT | PRINT SETTINGS 501 | | | | | INCONSISTENCY INFORMATION 502 | RECOMMENDATION INFORMATION 503 |
|---|---|---|---|---|---|---|---|---|
| | | PAPER TYPE | OUTPUT SIZE | COLOR MODE | PRIORITY IMAGE QUALITY | PRINT QUALITY | | |
| PRINTER 1 | ROLE 1 | PHOTO PAPER (THIN) | A0, A1, A2 | COLOR, MONOCHROME | LINE IMAGE, PHOTO ILLUSTRATION | BEAUTIFUL, NORMAL, FAST | PAPER MISMATCH REMAINING PAPER AMOUNT - SMALL | IMAGE CUT-OFF IS SOLVED IN A0 |
| PRINTER 1 | ROLE 2 | PHOTO PAPER (THIN) | A1, A2 | COLOR, MONOCHROME | LINE IMAGE, PHOTO ILLUSTRATION | BEAUTIFUL, NORMAL, FAST | IMAGE CUT-OFF PAPER MISMATCH | — |
| PRINTER 2 | ROLE 1 | PHOTO PAPER - SEMI-GLOSSY - (THIN) | A0, A1, A2 | COLOR, MONOCHROME | POSTER FLUORESCENT, PHOTO ILLUSTRATION | BEAUTIFUL, NORMAL, FAST | — | PAPER MISMATCH IS SOLVED IMAGE CUT-OFF IS SOLVED IN A0 <POSTER FLUORESCENT> |
| PRINTER 2 | ROLE 2 | PHOTO PAPER (THIN) | A0, A1, A2 | COLOR, MONOCHROME | POSTER FLUORESCENT, PHOTO ILLUSTRATION | BEAUTIFUL, NORMAL, FAST | — | IMAGE CUT-OFF IS SOLVED IN A0 <POSTER FLUORESCENCE> |
| PRINTER 3 | ROLE 1 | PHOTO PAPER (THIN) | A1, A2 | COLOR, MONOCHROME | LINE IMAGE, PHOTO ILLUSTRATION | BEAUTIFUL, NORMAL, FAST | — | — |

CONTROL METHOD CAPABLE OF SWITCHING BETWEEN IMAGE OUTPUT APPARATUSES, NON-TRANSITORY COMPUTER-READABLE STORAGE MEDIUM, AND INFORMATION PROCESSING APPARATUS

BACKGROUND

Field

The present disclosure mainly relates to an information processing apparatus.

Description of the Related Art

Japanese Patent Laid-Open No. 2014-211722 describes a configuration of a printing system that causes a plurality of image output apparatuses to selectively execute printing, in which when switching the image output apparatus for executing printing, if print settings before switching cannot be diverted or reused, the print settings are initialized.

In the configuration of Japanese Patent Laid-Open No. 2014-211722, if print settings are different before and after switching, the print settings are initialized. Hence, there is room for improvement in the aspect of convenience.

SUMMARY

The present disclosure provides a technique advantageous in improving the convenience of the system.

One of the aspects of the present disclosure provides a control method executed in an information processing apparatus capable of communicating with a plurality of image output apparatuses, comprising, based on an operation input by a user concerning switching of the plurality of image output apparatuses, specifying a difference of a print setting of the image output apparatus before and after the switching, and (i) for an item that has no difference of the print setting before and after the switching, diverting the print setting before the switching, and (ii) for an item that has the difference of the print setting before and after the switching, presenting a candidate of the print setting corresponding to the difference by the image output apparatus after the switching.

Further features of the present disclosure will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Figure 1:
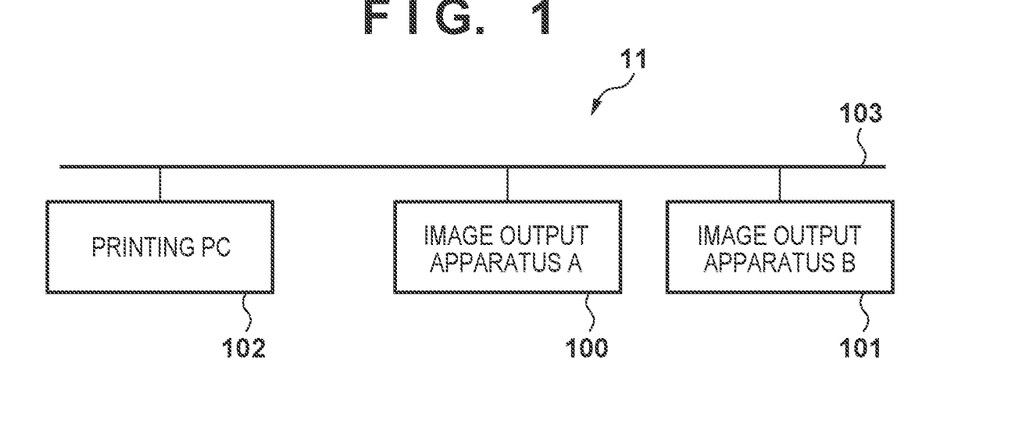
FIG. 1 is a block diagram illustrating an example of the configuration of an information processing system 11.

FIG. 1 illustrates an example of the configuration of an information processing system 11 according to the first embodiment. The information processing system 11 is a printing system including a plurality of (here, two) image output apparatuses 100 and 101, a personal computer (PC) 102, and a network 103. The PC 102 is an externally connected terminal, and typical examples are a desktop PC, a laptop PC, and a tablet terminal. A known printing apparatus is used as each of the image output apparatuses 100 and 101, and a typical example is an inkjet printer.

A print job created by the PC 102 is transmitted to the image output apparatuses 100 and 101 via the network 103, and printing according to the print job is executed. As will be described later in detail, the PC 102 can selectively cause the image output apparatuses 100 and 101 to execute printing, and can perform information processing for solving inconsistency that occurs at that time. In this viewpoint, the PC 102 can be expressed as an information processing apparatus.

Note that the number of image output apparatuses is two, including the image output apparatuses 100 and 101. However, the number is not limited to this example and can be two or more (these can be expressed as the image output apparatus 100 and the like without discrimination). In addition, the number of PCs 102 can be one or more.

When creating a print job, a user can do desired print settings on the display of the PC 102 as needed. When changing the print settings, the PC 102 can transmit/receive signals or information to/from the image output apparatus 100 and the like to, for example, confirm whether setting values (setting information, setting parameters, and the like) are consistent. If the setting values are not consistent, the PC 102 can notify the user of inconsistency information representing that via, for example, the display. As will be described later in detail, it is possible to, by the inconsistency information, solve inconsistency represented by the inconsistency information and appropriately implement desired printing in the image output apparatus 100 and the like.

As an example of execution of printing, a mode in which a print job is transmitted from a print application installed in the PC 102 to the image output apparatus 100 and the like via a printer driver will be described below. The print application acquires device information, print medium information, print parameters, and the like and displays print setting information based on these on the screen of the PC 102 (a display screen 600 illustrated in FIG. 6 to be described later). Here, the device information indicates individual information of the image output apparatus 100 and the like in which the printer driver is installed. The print medium information indicates the type and size of a print medium. The print parameters indicate the quality of printing and the like. The print setting information can include these and/or include associated information necessary for implementing printing based on these.

As will be described later in detail with reference to FIG. 6, the user can perform an operation input to the PC 102 and cause it to display, in a file list display portion 601, a list of file names, page numbers, and the like for a predetermined print document. Accordingly, for example, images rearranged on a page basis can be displayed in a preview display portion 602. Examples of a print document are a Portable Document Format (PDF) file and a Tagged Image File Format (TIFF) file. Also, a print job is transmitted to the image output apparatus 100 or the like based on print parameters set by the user on print setting display portion 603, and the image output apparatus 100 or the like starts print processing. The print parameters may be stored in each of the image output apparatus 100 and the like.

Figure 2:
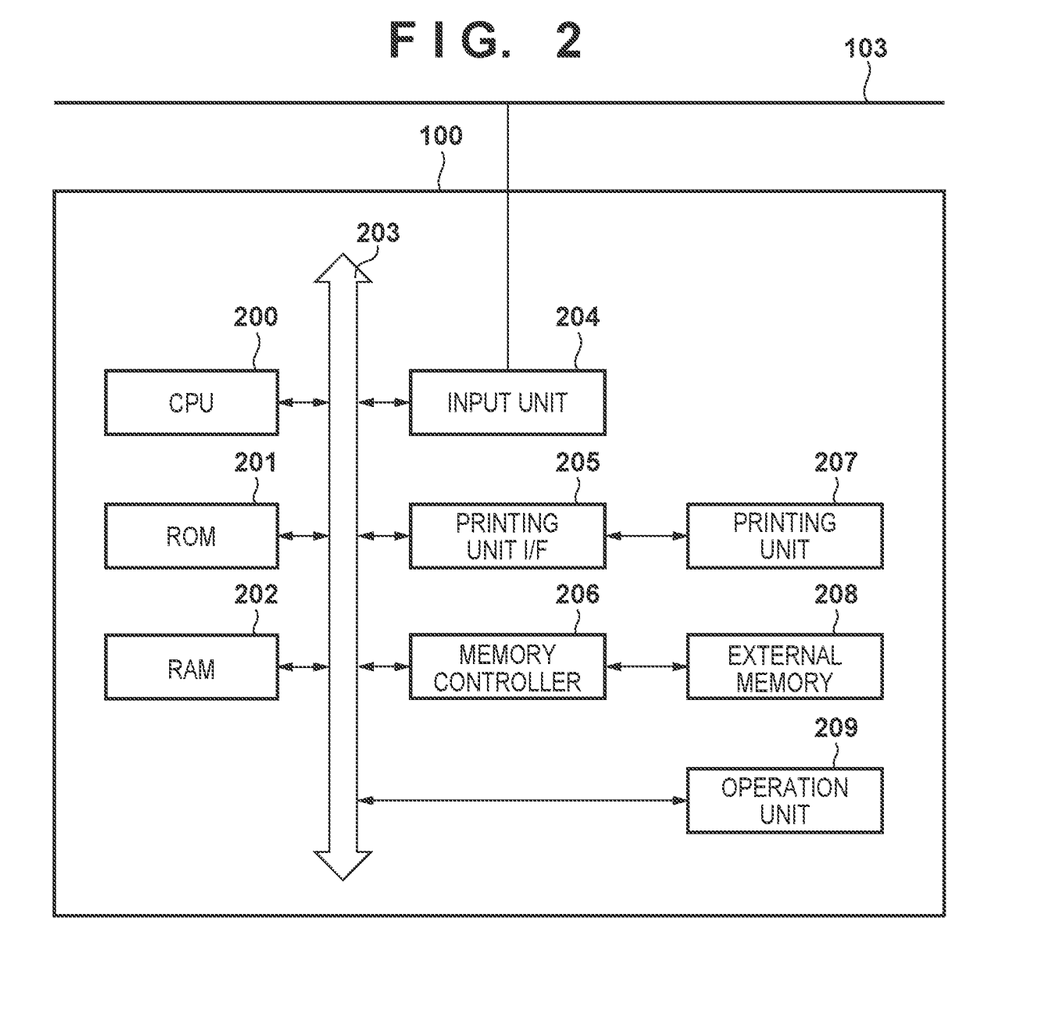
FIG. 2 is a block diagram illustrating an example of the hardware configuration of an image output apparatus.

FIG. 2 is a block diagram illustrating an example of the hardware configuration of the image output apparatus 100 (this also applies to the image output apparatus 101). The image output apparatus 100 includes a Central Processing Unit (CPU) 200, a Read Only Memory (ROM) 201, and a Random Access Memory (RAM) 202. The image output apparatus 100 also includes a system bus 203, an input unit 204, a printing unit interface (UF) 205, a memory controller 206, a printing unit 207, an external memory 208, and an operation unit 209.

The CPU 200 can transmit/receive signals to/from the ROM 201, the RAM 202, the input unit 204, the printing unit OF 205, and the memory controller 206 via the system bus 203, and can perform system control of the entire image output apparatus 100. Note that a semiconductor device such as an Application Specific Integrated Circuit (ASIC) may be used for the CPU 200. That is, the function of the CPU 200 may be implemented by either hardware or software.

The RAM 202 functions as the work area of the CPU 200, and may be expressed as a main memory or the like. A Dynamic RAM (DRAM), a Static RAM (SRAM), or the like is used as the RAM 202, and its capacity may be expanded by an additional memory connectable to an expansion port (not illustrated).

One or more programs can be stored in the ROM 201 and/or the external memory 208 in advance. A nonvolatile memory such as a Hard Disk (HDD) or a Solid State Drive (SSD) can be used as the ROM 201. Not only an HDD and an SSD but also a Universal Serial Bus (USB) memory, an Integrated Circuit (IC) card, and the like can be used as the external memory 208, and access to the external memory 208 can be controlled by the memory controller 206. In general, the external memory 208 is additionally connected to the image output apparatus 100, and stores font data, emulation programs, form data, and registration information about a print medium in use.

For example, the CPU 200 deploys, on the RAM 202, a predetermined program (for example, a control program necessary for execution of printing) stored in the ROM 201 or the external memory 208 and executes it. The CPU 200 performs processing necessary for execution of printing for image data and then outputs the processed data as an image signal from the printing unit I/F 205 to the printing unit 207 via the system bus 203. The printing unit 207 includes a printer engine and executes printing based on the image signal.

Also, the CPU 200 can communicate with the PC 102 via the input unit 204 and notify the PC 102 of the information of the image output apparatus 100 via the input unit 204 in the above-described execution of printing. The CPU 200 can also receive, from the PC 102, output data to be output to the printing unit 207. An operation panel is typically used as the operation unit 209, and a touch panel display capable of displaying predetermined information can be used.

Figure 3:
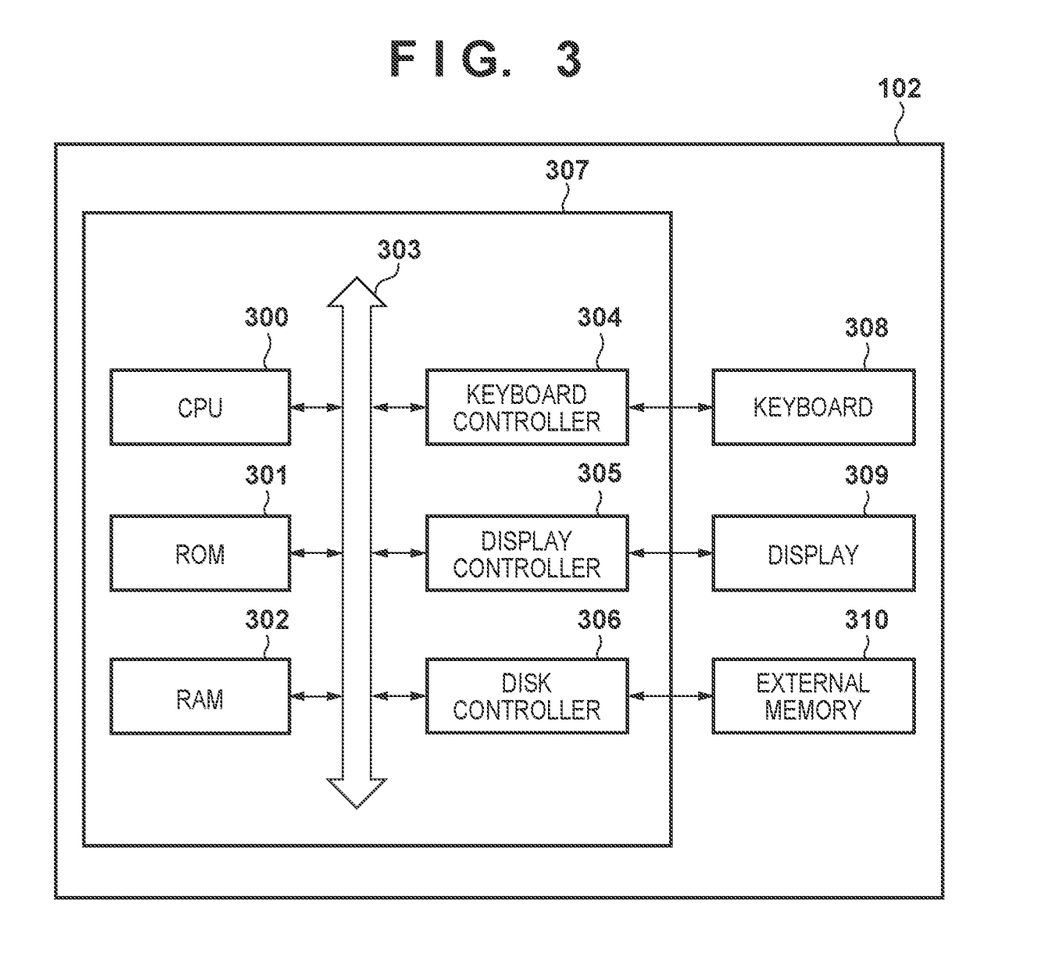
FIG. 3 is a block diagram illustrating an example of the configuration of the computer of a PC.

FIG. 3 is a block diagram illustrating an example of the configuration of the computer of the PC 102. The PC 102 includes a PC main body 307, and a keyboard 308, a display 309, and an external memory 310, which are connected to the PC main body 307. The PC main body 307 includes a CPU 300, a ROM 301, a RAM 302, a main bus 303, a keyboard controller 304, a display controller 305, and a disk controller 306. Note that the CPU 300, the ROM 301, the RAM 302, and the main bus 303 are configured like the CPU 200, the ROM 201, the RAM 202, and the system bus 203, respectively.

The PC main body 307 can transmit/receive signals to/from the keyboard 308, the display 309, and the external memory 310 via the keyboard controller 304, the display controller 305, and the disk controller 306, respectively. For example, the keyboard controller 304 can control an operation input from the keyboard 308, and can also control an operation input from a pointing device (not illustrated). The display controller 305 controls display of the display 309. The disk controller 306 controls access of the CPU 300 to the external memory 310.

The CPU 300 deploys, on the RAM 302, a program read out from the ROM 301 and executes it. Examples of programs to be read out are a control program, a system program, and an application program. The CPU 300 can perform data processing based on the readout program and display control of the display 309. The CPU 300 can also deploy, on the RAM 302, a program read out from the external memory 310 via the disk controller 306 and execute.

Figure 4:
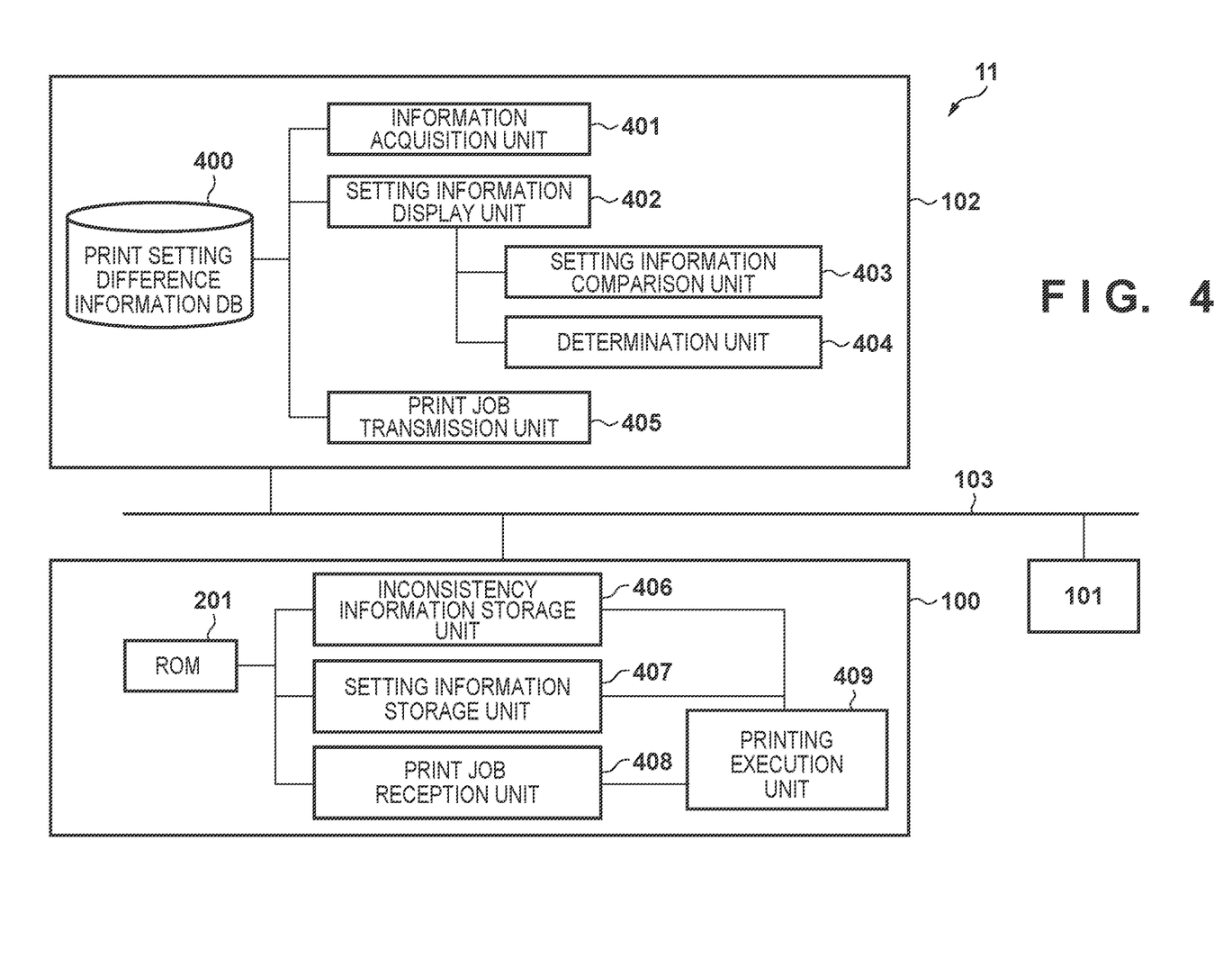
FIG. 4 is a block diagram for explaining the functions of the information processing system.

FIG. 4 is a block diagram for explaining the functions of the information processing system 11. Note that the image output apparatus 101 has the same configuration as the image output apparatus 100, and a detailed description thereof will be omitted here.

For the image output apparatus 100, the ROM 201 can be distinguished into a plurality of regions, and in this example, these function as an inconsistency information storage unit 406, a setting information storage unit 407, a print job reception unit 408, and a printing execution unit 409. The inconsistency information storage unit 406 stores inconsistency information representing a state in which printing by the image output apparatus 100 is not appropriately implemented. Contents of inconsistency can be specified based on the inconsistency information. Note that the inconsistency information includes error information representing jamming of a print medium (paper jam if the print medium is paper) or a shortage of the remaining amount of a consumable (a print medium, ink, or the like).

The setting information storage unit 407 stores, for example, registration information about a print medium, more specifically, setting information set by the user using the operation unit 209, such as the type and size of a print medium. The print job reception unit 408 receives a print job transmitted from the PC 102. For example, it can be determined, based on the setting information stored in the setting information storage unit 407 and the state of inconsistency, whether printing can appropriately be executed. If printing can appropriately be executed, the printing execution unit 409 executes print processing.

In the PC 102, a print setting difference information database (DB) 400, an information acquisition unit 401, a setting information display unit 402, a setting information comparison unit 403, a determination unit 404, and a print job transmission unit 405 are provided. The information acquisition unit 401 can acquire the information of the printer driver installed in the PC 102 and a spooler for temporarily holding a print job, and can also acquire the information of the inconsistency information storage unit 406 and the setting information storage unit 407 in each of the image output apparatuses 100 and 101. The print setting difference information DB 400 stores information acquired by the information acquisition unit 401. The setting information display unit 402 displays a screen illustrating print settings based on information in the print setting difference information DB 400. The setting information display unit 402 can also cause the print job transmission unit 405 to generate and transmit a print job.

If the image output apparatus 100 is selected on the setting information display unit 402, for the contents of print settings of the image output apparatus 100, the setting information comparison unit 403 specifies the difference before and after the selection. More specifically, the difference is specified for each of contents set in individual items such as device information, print medium information, and print parameters. If inconsistency information exists before the selection, the determination unit 404 specifies, for each item, the presence/absence of a setting (candidate) capable of solving inconsistency represented by the inconsistency information by the image output apparatus 100 after the selection.

Figure 5:
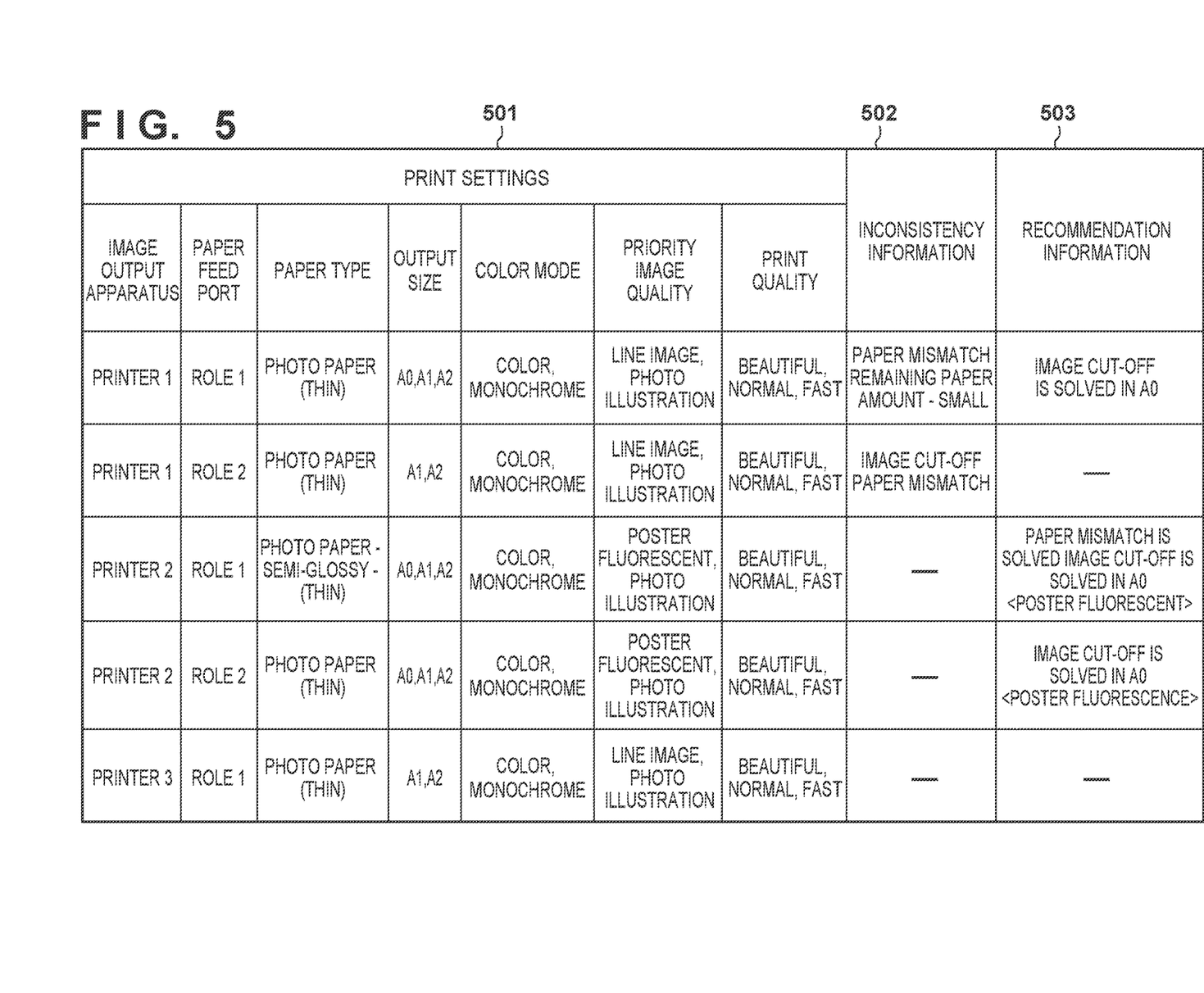
FIG. 5 is a view illustrating an example of print setting difference information.

FIG. 5 illustrates an example of information (to be referred to as print setting difference information hereinafter) stored in the print setting difference information DB 400. In this example, the print setting difference information includes a print setting 501, inconsistency information 502, and recommendation information 503. As another example, parameters and the like representing these may additionally/alternatively be shown.

The print setting 501 illustrates a function that can be set for the selected image output apparatus and may be expressed as function information. In this embodiment, the print setting 501 is formed by an image output apparatus, a paper feed port (output tray), a paper type (print medium type), an output size (one of sizes with which a predetermined standard complies), a color mode (color printing or monochrome printing), priority image quality, and print quality. The print application acquires the setting values of the printer driver of each printing apparatus, thereby generating the print setting 501. Also, the print application updates the print setting 501 using information acquired from the printing apparatus.

The inconsistency information 502 indicates inconsistency information representing that printing cannot appropriately be implemented unless the settings are changed. If there are two or more paper feed ports, the inconsistency information 502 indicates inconsistency information for each of the paper feed ports. In the example illustrated in FIG. 5, "paper mismatch" and "remaining paper amount—small" are stored for roll 1 of printer 1. "Remaining paper amount—small" is stored by the print application acquiring "remaining paper amount—small" concerning roll 1 from the inconsistency information storage unit 406 of the image output apparatus 100. "Paper mismatch" is information stored when new paper that is not registered in the printer driver of printer 1 is registered in printer 1.

The recommendation information 503 indicates a setting (candidate) capable of solving inconsistency of the inconsistency information 502 in the image output apparatus 100 selected on the setting information display unit 402. In this viewpoint, the recommendation information 503 may be expressed as candidate information.

In the print setting difference information, pieces of information acquired by the information acquisition unit 401 are displayed in the order of acquisition. As another example, for example, the pieces of information may be rearranged in the order of the printer names of the image output apparatuses, or may be rearranged by another known method. Here, three pieces of print setting difference information are shown to make the drawing easy to view. However, the number of print setting difference information is not limited to the example.

Figure 6:
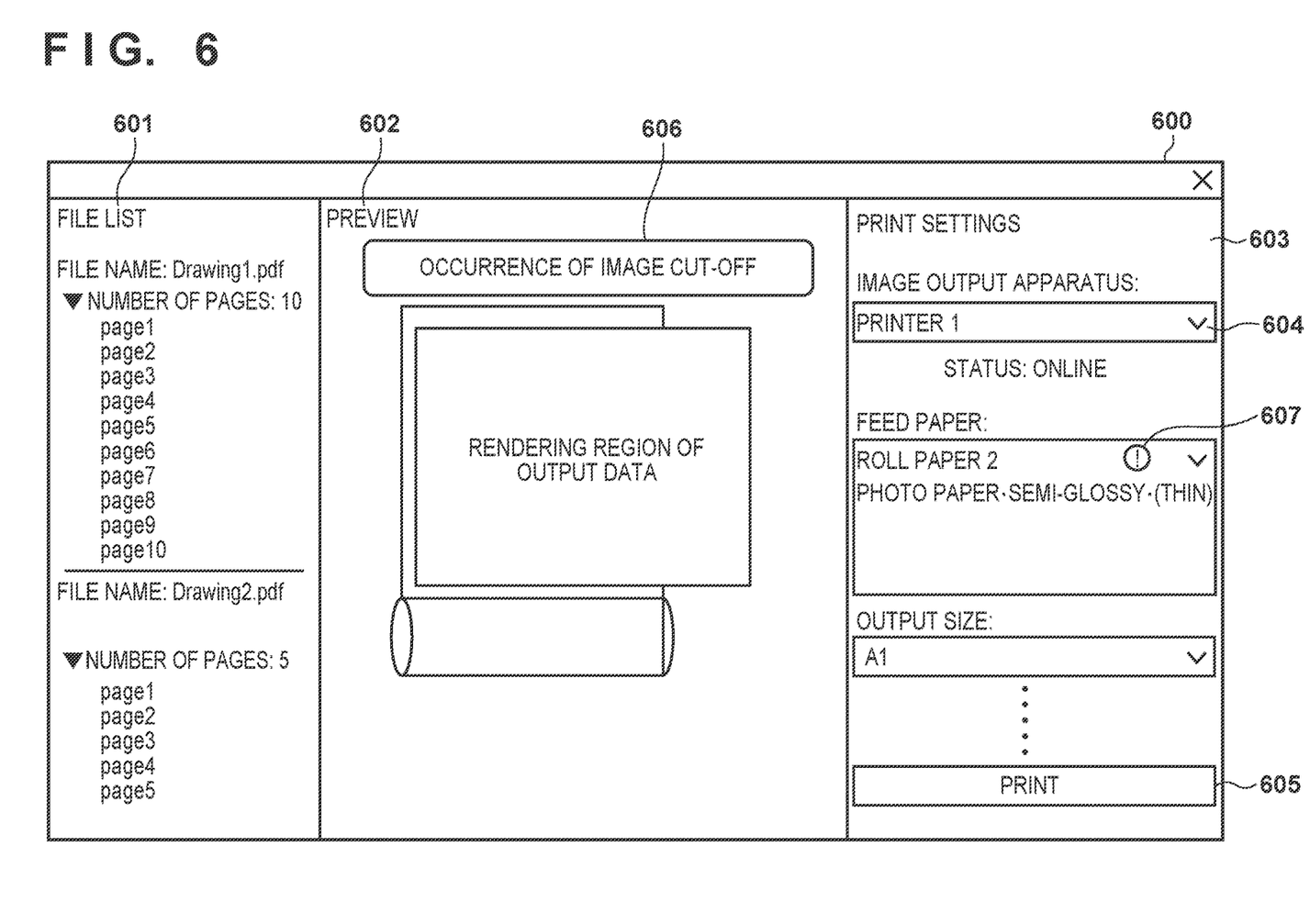
FIG. 6 is a view illustrating an example of a display screen of print setting information.

FIG. 6 illustrates a display screen 600 displayed on the display 309 of the PC 102. Here, as an example, the display screen 600 shows print setting information concerning the image output apparatus 100. The display screen 600 includes the file list display portion 601, the preview display portion 602, and the print setting display portion 603. The file list display portion 601 lists and displays pieces of information concerning a print target document for a predetermined unit (for example, on a page basis). The preview display portion 602 displays one of information (for example, the preview of the layout of a selected page) selected from the list in the file list display portion 601. The print setting display portion 603 displays setting values (setting information, parameters, and the like) set at that point of time such that these can be changed. Note that in the display screen 600, only some (for example, the print setting display portion 603) of the display portions 601 to 603 may be displayed (other display portions may framed out from the display screen 600), or another display portion may further be displayed.

If a drop-down list 604 of image output apparatus is selected in the print setting display portion 603, the image output apparatus 100 or the like to be used for printing can be changed. Also, if a print button 605 is pressed, a print job can be created and transmitted to the image output apparatus 100 or the like. As will be described later in detail, the above-described inconsistency information is displayed by a predetermined icon 607 in the field of "feed paper".

Here, the paper feed port and the paper type in the print setting 501 are displayed together in "feed paper". However, these may be individually displayed and individually changed. Similarly, a known change may be applied to another display mode as well. For example, the priority image quality, the print quality, and the like in the print setting 501 may be displayed together. Alternatively, a list of thumbnails may be displayed in the file list display portion 601. The display mode of these may be changeable on the display screen 600.

If the inconsistency information 502 exists for the image output apparatus 100 selected in the drop-down list 604, a message 606 and the icon 607, which are configured to notify the user of it, can be displayed on the display screen 600. In this example, if the image output apparatus is "printer 1", and the paper feed port is "roll 2", in the preview display portion 602, a state in which the image to be printed is located outside the outer edge of the print medium (to be referred to as "image cut-off" hereinafter) is visually displayed, and the message 606 representing "occurrence of image cut-off" is displayed. In "Drawing1.pdf" as the print target, "A0" is set as the output size. Also, paper sizes usable in roll 2 are "A1" and "A2", as can be seen from FIG. 5. Hence, the print application can determine that image cut-off occurs. In addition, if the paper type that can be designated in the printer driver of the selected image output apparatus does not match the setting information acquired from the image output apparatus 100, the icon 607 can be displayed at a corresponding position (here, on the drop-down list in the print setting display portion 603).

Note that the above-described display may be done in another known mode, and may be implemented by, for example, a popup message, a tooltip, or the like, and/or another expression such as progress, confirmation, or warning may be used as an expression used for that. Also, two or more messages 606 and two or more icons 607 may be displayed.

Figure 7A:
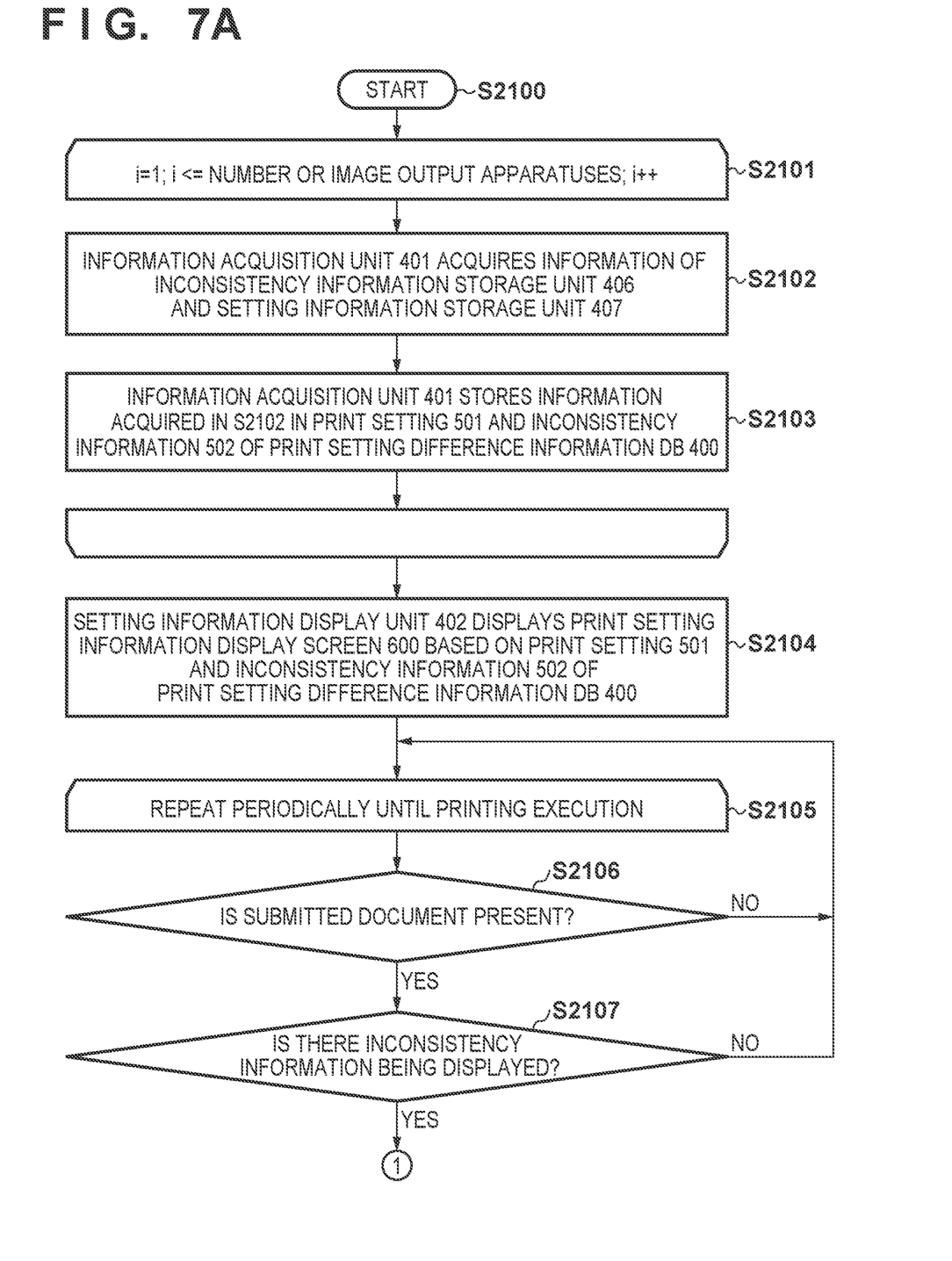
FIGS. 7A and 7B are a flowchart illustrating a method of displaying the display screen of print setting information on the PC.
Figure 7B:
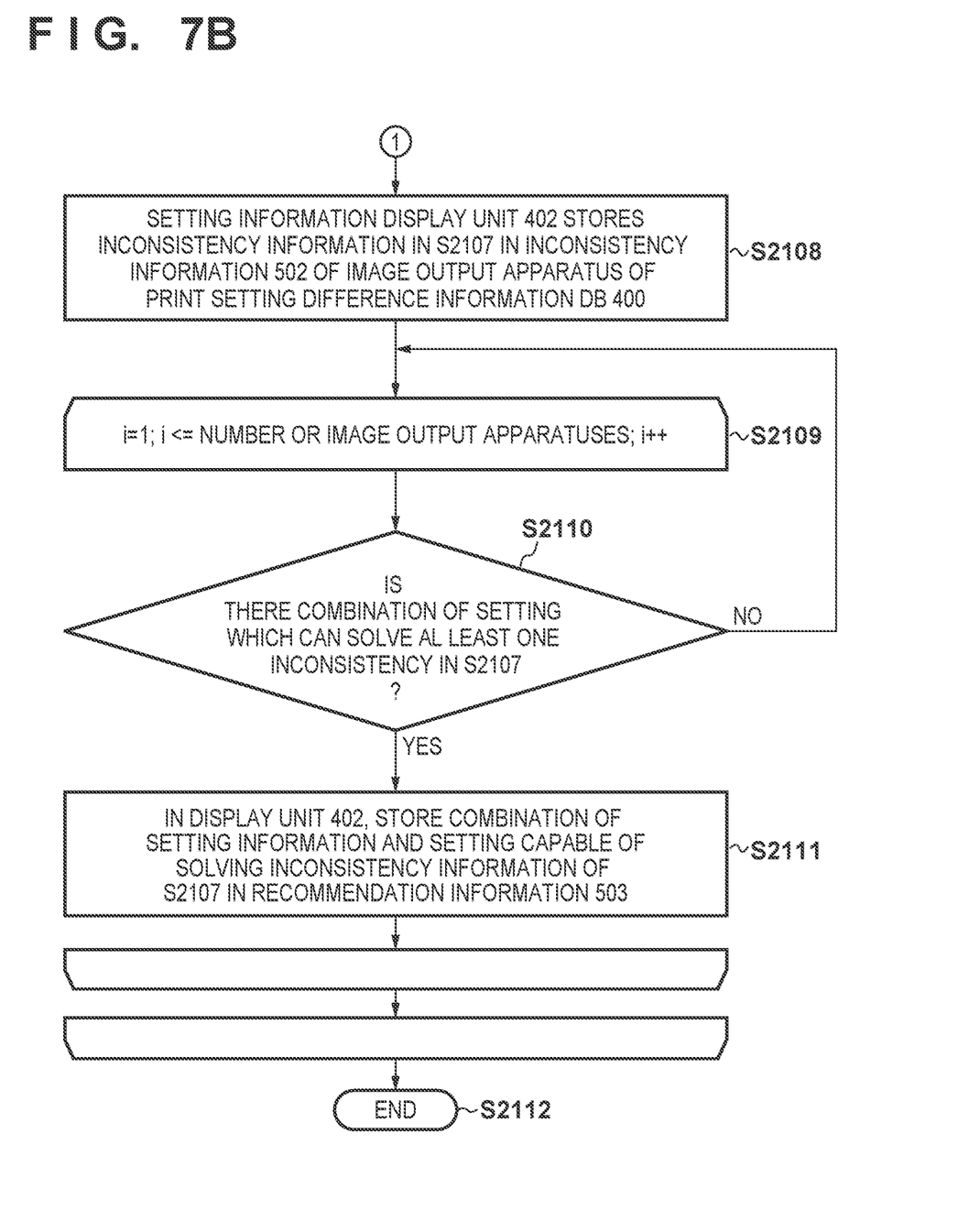

FIGS. 7A and 7B indicate a flowchart illustrating an example of a method of displaying the display screen 600 of print setting information on the PC 102. Note that this flowchart can be implemented mainly by the CPU 300 reading out a predetermined program (for example, a print application) from the ROM 301, deploying it on the RAM 302, and executing it.

Step S2100 (to be simply referred to as "S2100" hereinafter, and this also applies to other steps to be described later) is started, for example, in response to activation of the print application in the printing PC 102.

In S2101, the following processing is repetitively executed by the information acquisition unit 401 in accordance with the number of image output apparatuses 100 set in the print application. In S2102, the information acquisition unit 401 acquires information in the inconsistency information storage unit 406 and the setting information storage unit 407 from the image output apparatus 100. In S2103, pieces of acquired information are stored as the print setting 501 and the inconsistency information 502 in the print setting difference information DB 400. That is, in S2103, "remaining paper amount—small" and "paper mismatch" are stored.

After repetition of the above-described processing is completed, in S2104, the setting information display unit 402 displays the screen 600 of print setting information based on the print setting 501 and the inconsistency information 502 in the print setting difference information DB 400.

In S2105, in the print application, until the print button 605 is pressed on the display screen 600, the following processing is executed by the setting information display unit 402 repetitively at a predetermined period. In S2106, the setting information display unit 402 determines the presence/absence of a submitted document on the display screen 600. If a submitted document exists, in S2107, the presence/absence of the message 606 or the icon 607 on the display screen 600 is determined. If the message 606 or the icon 607 exists, in S2108, the setting information display unit 402 stores the inconsistency information as the inconsistency information 502 of the image output apparatus 100 in the print setting difference information DB 400.

S2107 will be described here with reference to FIG. 6. In FIG. 6, since "printer 1" and "roll 2" are selected, the print application determines that paper mismatch has occurred. Hence, the icon 607 is displayed. Also, since the output size (for example, "A0") of the submitted document is larger than "A1" and "A2", which can be designated for "printer 1" and "roll 2", the print application determines that image cut-off occurs, and displays the message 606. That is, the inconsistency information "image cut-off" is stored in S2108.

In S2109, the following processing is repetitively executed by the setting information display unit 402 in accordance with the number of image output apparatuses registered in the print application. In S2110, the setting information display unit 402 determines the presence/absence of a setting (or a combination of settings for two or more items) capable of solving the inconsistency in S2107 described above. If a setting capable of solving the inconsistency exists, in S2111, the setting is stored as the recommendation information 503. For example, in this embodiment, image cut-off occurs because the print application cannot designate the output size (for example, "A0") of the submitted document for "printer 1" and "roll 2". Here, the print application determines that if the settings are changed to "printer 1" and "roll 1", A0 can be used, and the inconsistency of image cut-off can be solved. For this reason, the print application stores "image cut-off is solved in A0" as the recommendation information 503 for "printer 1" and "roll 1", as illustrated in FIG. 5. The solution of inconsistency here includes at least partially solving the inconsistency. After repetition of the above-described processing is completed, the flowchart is ended in S2112.

The above-described steps may be modified without departing from the scope of this embodiment. For example, repetition of processing in S2101 to S2103 may be performed after S2104, and the display screen 600 may be updated.

Figure 8:
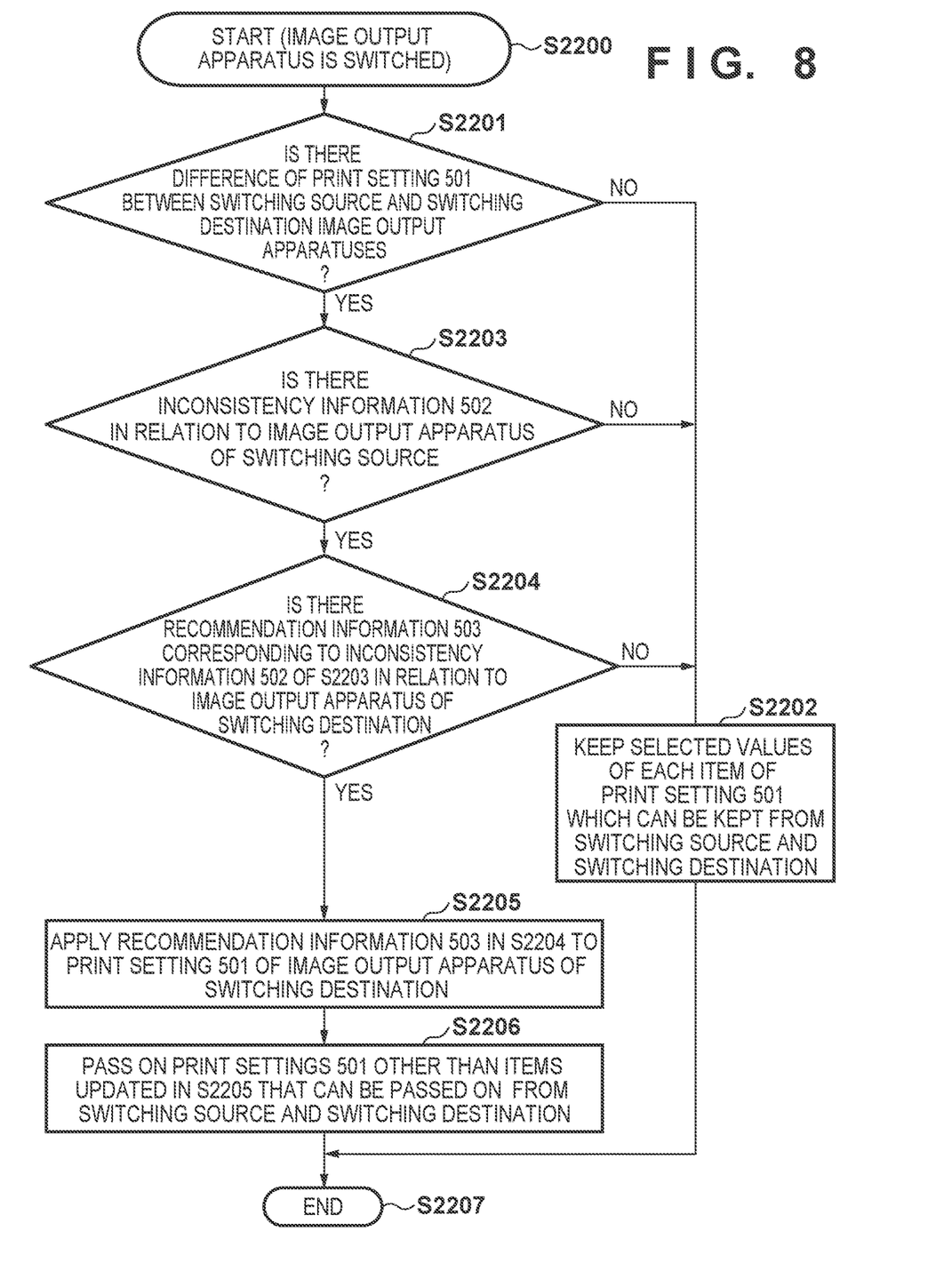
FIG. 8 is a flowchart illustrating an updating method for a print setting.

FIG. 8 is a flowchart illustrating an updating method for the print setting 501 in a case where the image output apparatus 100 selected in the drop-down list 604 of the display screen 600 is changed (switched) to another image output apparatus. Note that this flowchart can be implemented mainly by the CPU 300 reading out a predetermined program (for example, a print application) from the ROM 301, deploying it on the RAM 302, and executing it, like the flowchart illustrated in FIGS. 7A and 7B.

S2200 is started, for example, in response to an operation input of switching of the image output apparatus in the PC 102. This switching may be expressed as change or selection.

In S2201, the setting information comparison unit 403 determines the presence/absence of the difference of the print setting 501 between the image output apparatus of the switching source (before switching) and that of the switching destination (after switching). If the difference exists, the process advances to S2203. Otherwise, the process advances to S2202. For example, if a state in which "printer 1" and "roll 2" are selected is switched to a state in which "printer 2" and "roll 1" are selected, there are print setting differences in "output size" and "priority image quality". Hence, the print application determines YES in S2201.

In S2203, for the image output apparatus of the switching source, the determination unit 404 determines the presence/absence of the inconsistency information 502. If the inconsistency information 502 exists, the process advances to S2204. Otherwise, the process advances to S2202.

In S2204, for the image output apparatus of the switching destination, the determination unit 404 determines the presence/absence of the recommendation information 503 corresponding to the inconsistency information 502 determined to exist in S2203. If the recommendation information 503 exists, the process advances to S2205. Otherwise, the process advances to S2202.

In S2205, the setting information display unit 402 stores the recommendation information 503 determined to exist in S2204 as the print setting 501 of the image output apparatus of the switching destination. For example, in FIG. 5, if a state in which "printer 1" and "roll 2" are selected is switched to a state in which "printer 2" and "roll 1" are selected, the print application stores the output size "A0". At this time, for an element or item that does not need a change in the print setting 501, the print setting is directly diverted or reused to be kept in S2206. After that, the flowchart is ended in S2207.

On the other hand, in S2202, for an element or item that does not need a change in the print setting 501, the setting information display unit 402 diverts and keeps the print setting. After that, the flowchart is ended in S2207.

The above-described steps may be modified without departing from the scope of this embodiment. For example, if the recommendation information 503 exists in the determination of S2204, the contents of the recommendation information 503 may be presented to the user before S2205, and after the user performs an operation input of confirmation, the process may advance to the next step.

Figure 9:
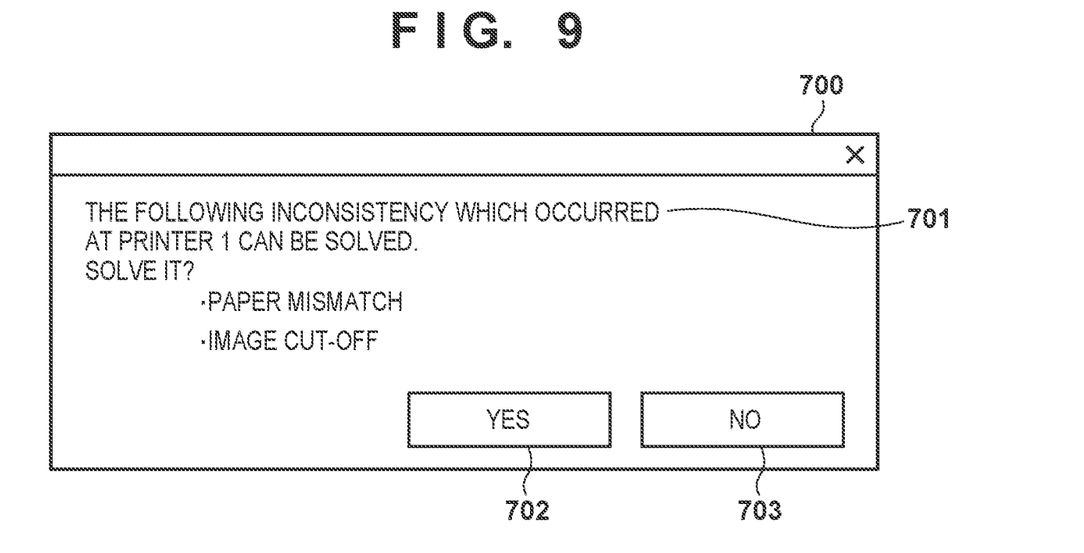
FIG. 9 is a view illustrating an example of a recommendation information display screen.

If YES in S2204, a recommendation information display screen 700 may be presented to the user, as illustrated in FIG. 9. In the recommendation information display screen 700, the recommendation information 503 is displayed by a message 701. If a button 702 indicating "YES" is pressed, the processes of S2205 and S2206 can be executed. On the other hand, if a button 703 indicating "NO" is pressed, the process of S2202 can be executed.

Also, if the difference of the print setting 501 exists between the image output apparatus of the switching source and that of the switching destination in S2201, information representing the difference may be presented to the user by the message 701 independent of the presence/absence of the inconsistency information 502 for the image output apparatus of the switching source. For example, if roll 2 of printer 1 is changed to roll 1 of printer 2, it is possible to present a message representing that paper whose output size is "A0" and whose priority image quality is "poster fluorescent" can be selected.

According to the information processing system 11, when selecting one of the plurality of image output apparatuses 100 and 101 and executing printing from the PC 102, solution of inconsistency that can occur between these can relatively easily be implemented by a print setting based on the recommendation information 503. Hence, according to this embodiment, it is advantageous in improving the convenience of the information processing system 11 that can selectively use the plurality of image output apparatuses 100 and 101.

Second Embodiment

In the above-described first embodiment, for example, in S2110 (see FIGS. 7A and 7B), if a plurality of settings (or combinations of settings for two or more items) capable of solving the inconsistency in S2107 exist, these are preferably individually presented to the user as the second embodiment. At this time, the effect or influence of the change when these settings are selected, for example, how the printing result will change may be presented to the user.

For example, assume that, as illustrated in FIG. 5, in a case where roll 2 is selected in printer 1, there exist a plurality of print setting candidates when switching to printer 2 to solve inconsistency. At this time, if candidates of print settings (recommended values) capable of solving each inconsistency are presented to the user, like a recommendation information display screen 800 illustrated in FIG. 10, thereby allowing the user to select a candidate in line with the intention of the user.

Figure 10:
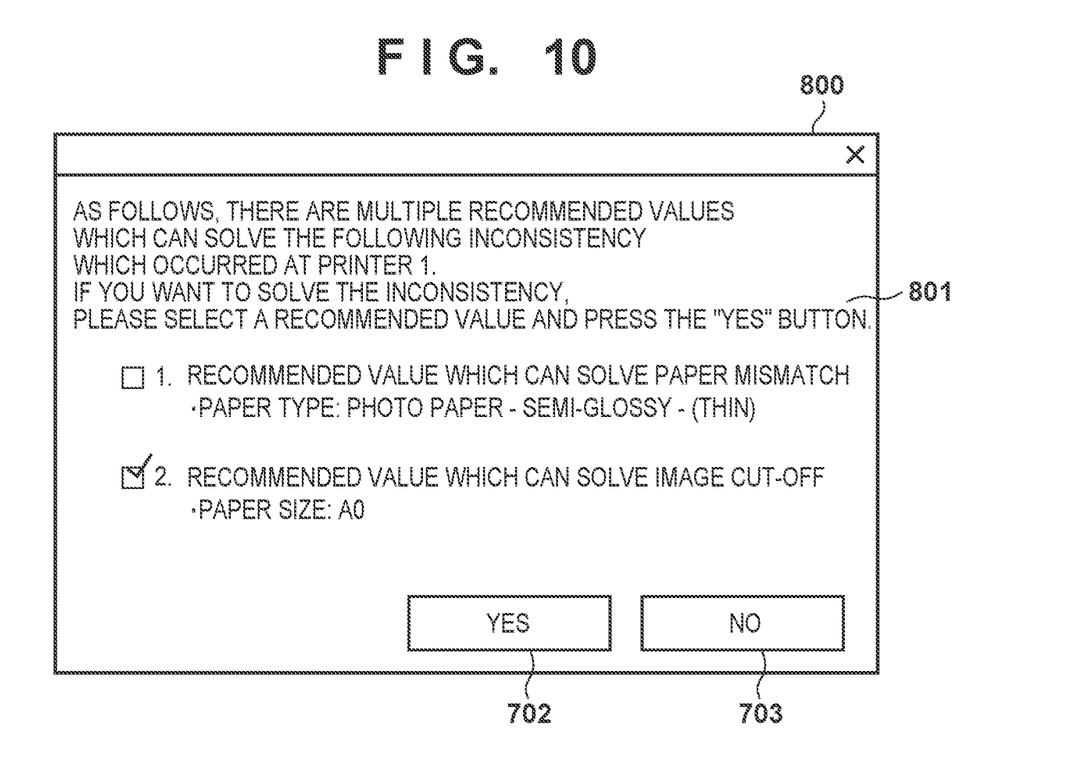
FIG. 10 is a view illustrating another example of the recommendation information display screen.

In the example illustrated in FIG. 10, assume that the second candidate is selected based on a message 801 as the candidate capable of solving the inconsistency of image cut-off, and a button 702 indicating "YES" is then pressed in FIG. 10. In this case, "photo paper (thin)" is maintained (roll 2 is selected) for "paper type", and the output size is set to "A0". Note that if the first candidate is selected, and the button 702 indicating "YES" is pressed in FIG. 10, "photo paper—semi-glossy—(thin)" is set (roll 1 is selected) for "paper type", and the output size is set to "A0".

Note that on the recommendation information display screen 800, in addition to/in place of solution of inconsistency, another effect different from the solution of inconsistency, for example, "printing in fluorescent color is possible" may further be presented.

According to this embodiment, if there exist a plurality of candidates of print settings capable of at least partially solving inconsistency, the plurality of candidates are presented to the user by the recommendation information display screen 800 illustrated in FIG. 10. The user can thus select a candidate for solving corresponding inconsistency. Hence, according to this embodiment, it is advantageous in further improving the convenience of an information processing system 11.

Third Embodiment

In the above-described first embodiment, for example, in S2110 (see FIGS. 7A and 7B), if a setting capable of solving the inconsistency in S2107 is already recorded or registered in a predetermined DB as a use history, a favorite setting, or the like, this/these may be presented to the user as the third embodiment. The use history is setting information or history information selected by the user and used in the past, and an example is information representing a job name, the date/time of printing execution, a thumbnail, a print setting, or the like. The favorite setting is generally setting information registered by the user himself/herself such that the user can set it at an arbitrary timing. In the viewpoint that a set history exists, the favorite setting may be included in the concept of use history described above. If the use history is presented to the user, the user can readily image the printing result, and desired printing can more appropriately be implemented.

Figure 11:
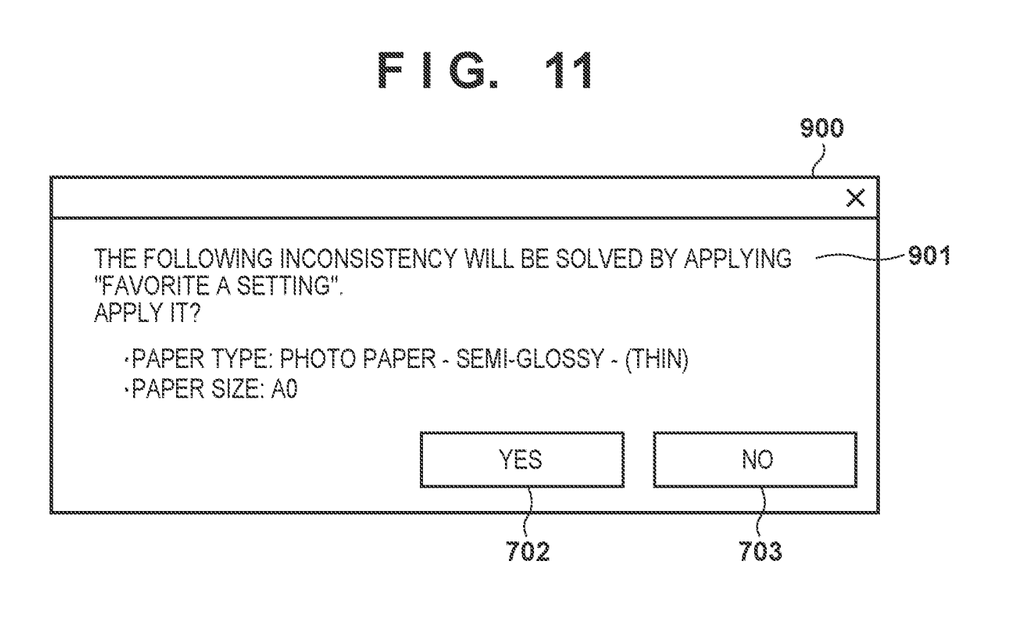
FIG. 11 is a view illustrating still another example of the recommendation information display screen.

For example, if roll 2 is selected in printer 1, as illustrated in FIG. 5, and this is switched to printer 2 to solve inconsistency, a recommendation information display screen 900 illustrated in FIG. 11 may be presented in addition to/in place of the first and second embodiments. That is, the user selects a predetermined favorite setting based on a message 901 in the recommendation information display screen 900, thereby selecting a candidate in line with the intention of the user. Note that when displaying the recommendation information display screen 900, the contents of the display may include the display contents of the recommendation information display screen 800 (see FIG. 10) according to the above-described second embodiment.

In this embodiment, if a print setting capable of at least partially solving inconsistency is already recorded or registered in a predetermined DB as a use history, a favorite setting, or the like, the recorded or registered print setting is presented as a candidate to the user by the recommendation information display screen 900 illustrated in FIG. 11. Thus, the user can readily image the printing result, and desired printing can more appropriately be implemented. Hence, according to this embodiment, it is advantageous in further improving the convenience of an information processing system 11.

Fourth Embodiment

In the above-described first embodiment, for example, in S2110 (see FIGS. 7A and 7B), if there is no setting capable of solving the inconsistency in S2107, an image output apparatus different from the image output apparatus of the switching destination (and the switching source) may be presented to the user as a new candidate of the switching destination.

For example, in a case where roll 2 is selected in printer 1, as illustrated in FIG. 5, the user may unintentionally/erroneously select an image output apparatus (for example, printer 3) that does not have a candidate of a print setting for solving inconsistency. Printer 2 has a candidate of a print setting capable of solving inconsistency. In this case, a recommendation information display screen 1000 illustrated in FIG. 12 may be presented. Based on the recommendation information display screen 1000, the user can switch the image output apparatus to printer 2 having the candidate capable of solving inconsistency.

Figure 12:
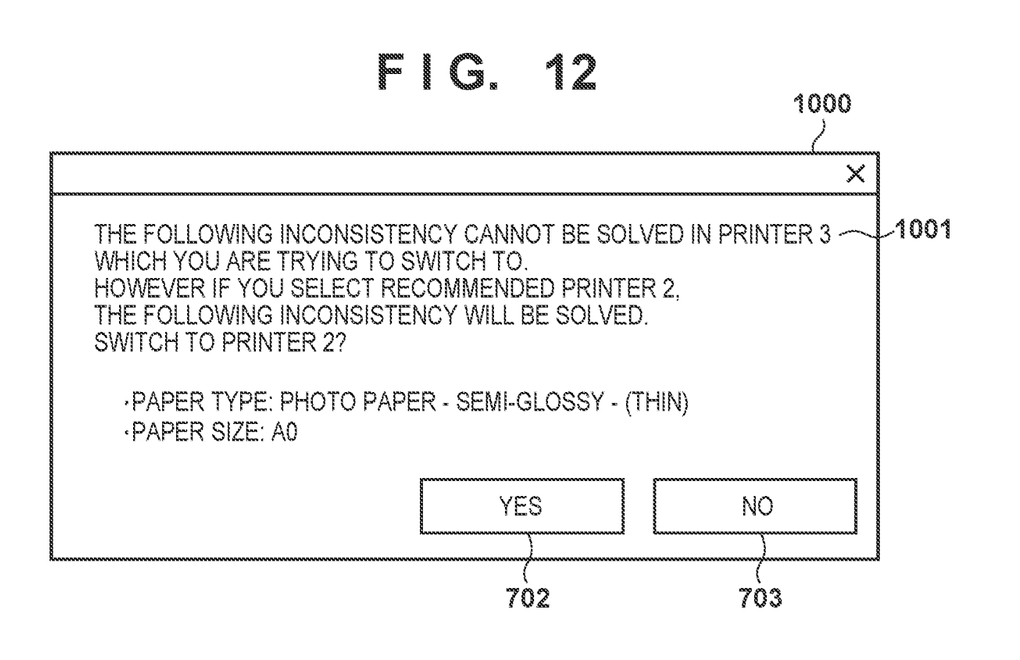
FIG. 12 is a view illustrating still another example of the recommendation information display screen.

In this embodiment, if a device that does not have a candidate of a print setting capable of at least partially solving inconsistency is selected, switching to another image output apparatus is presented to the user by the recommendation information display screen 1000 illustrated in FIG. 12. Thus, the user can appropriately implement desired printing using another image output apparatus. Hence, according to this embodiment, it is advantageous in further improving the convenience of an information processing system 11.

<Program>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Other Embodiments

In the above description, the image output apparatus 100 and the like have been described as an example of a printing apparatus using an inkjet printing method. However, the printing method is not limited to the above-described mode. The printing apparatus may be a single-function printer having only a printing function, or a multi-function printer having a plurality of functions such as a printing function, a FAX function, and a scanner function. The printing apparatus may also be a manufacturing apparatus configured to manufacture, for example, a color filter, an electronic device, an optical device, or a microstructure by a predetermined printing method.

"Print" in this specification should be interpreted in a broader sense. Hence, the mode of "print" can be defined regardless of whether the target to be formed on a print medium is significant information such as a character or a graphic or not and regardless of whether it becomes obvious to allow human to visually perceive.

"Print media" should also be interpreted in a broader sense, like "print". Hence, the concept of "print media" can include not only paper sheets used in general but also any members capable of receiving ink, including fabrics, plastic films, metal plates, glass, ceramic, resins, wood, and leather materials.

"Ink" should also be interpreted in a broader sense, like "print". Hence, the concept of "ink" can include not only a liquid which is applied onto print media to form an image, design, pattern, or the like but also an additional liquid that can be used to process print media or process ink (for example, coagulate or insolubilize color materials in ink applied to print media).

In the embodiments, individual elements are named by expressions based on their main functions. However, the functions described in the embodiments may be sub-functions, and the expressions are not strictly limited. Also, the expressions can be replaced with similar expressions. In the same vein, an expression "unit (portion)" can be replaced with an expression "tool", "component", "member", "structure", "assembly", or the like. Alternatively, these may be omitted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-202042, filed on Dec. 13, 2021, which is hereby incorporated by reference herein in its entirety.

What is claimed is:

1. A control method executed in an information processing apparatus capable of communicating with a plurality of image output apparatuses, comprising:
   based on an operation input by a user concerning switching of the plurality of image output apparatuses, specifying an existence of a difference, between before and after the switching, of a settable content for each of a plurality of print setting items; and
   (i) for a first setting item, among the plurality of print setting items, which has no existence of the difference between before and after the switching, setting the same content after the switching as before the switching, and (ii) for a second setting item which has an existence of the difference between before and after the switching, presenting information about a content which is not settable before the switching and is settable after the switching.

2. The method according to claim 1, wherein in the presenting, inconsistency caused by the difference when executing printing by the image output apparatus after the switching in a case where the difference exists between before and after the switching is specified, and a settable content which solves the inconsistency after the switching is presented.

3. The method according to claim 2, wherein in the presenting, if there exists a plurality of settable contents, which solve the inconsistency after the switching, the plurality of, settable contents and their effects obtained when the settable contents are selected are presented.

4. The method according to claim 2, wherein in the presenting, if the settable content which solves the inconsistency exists in a use history, the settable content in the use history is presented.

5. The method according to claim 2, wherein in the presenting, if the settable content which solves the inconsistency does not exist after the switching, and another image output apparatus different from the image output apparatus before and after the switching has the settable content which solves the inconsistency, said another image output apparatus is presented as a candidate of a new switching destination.

6. A non-transitory computer-readable storage medium storing a program for an information processing apparatus capable of communicating with a plurality of image output apparatuses, the program configured to cause a computer to execute:
based on an operation input by a user concerning switching of the plurality of image output apparatuses, specifying an existence of a difference, between before and after the switching, of a settable content for each of a plurality of print setting items; and
(i) for a first setting item, among the plurality of print setting items, which has no existence of the difference between before and after the switching, setting the same content after the switching as before the switching, and (ii) for a second setting item which has an existence of the difference between before and after the switching, presenting information about a content which is not settable before the switching and is settable after the switching.

7. The non-transitory computer-readable storage medium according to claim 6, wherein the program further causes a computer to execute:
in the presenting, inconsistency caused by the difference when executing printing by the image output apparatus after the switching in a case where the difference exists between before and after the switching is specified, and a settable content which solves the inconsistency after the switching is presented.

8. The non-transitory computer-readable storage medium according to claim 7, wherein the program further causes a computer to execute:
in the presenting, if there exists a plurality of settable contents which solve the inconsistency after the switching, the plurality of settable contents and their effects obtained when the settable contents are selected are presented.

9. A The non-transitory computer-readable storage medium according to claim 7, wherein the program further causes a computer to execute:
in the presenting, if the settable content which solves the inconsistency exists in a use history the settable contents in the use history is presented.

10. A The non-transitory computer-readable storage medium according to claim 7, wherein the program further causes a computer to execute:
in the presenting, if the settable content which solves the inconsistency does not exist after the switching, and another image output apparatus different from the image output apparatus before and after the switching has the settable content which solves the inconsistency, the another image output apparatus is presented as a candidate of a new switching destination.

11. An information processing apparatus capable of communicating with a plurality of image output apparatuses, comprising at least one memory and at least one processor and/or at least one circuit which function as:
a specifying unit configured to, based on an operation input by a user concerning switching of the plurality of image output apparatuses, specify an existence of a difference, between before and after the switching, of a settable content for each of a plurality of print setting items; and
a presentation unit configured to, (i) for a first setting item, among the plurality of print setting items, which has no existence of the difference between before and after the switching, setting the same content after the switching as before the switching, and (ii) for a second setting item which has an existence of the difference between before and after the switching, presenting information about a content which is not settable before the switching and is settable after the switching.

12. The apparatus according to claim 11, wherein the specifying unit specifies inconsistency caused by the difference when executing printing by the image output apparatus after the switching in a case where the difference exists between before and after the switching, and the presentation means presents a settable content which solves the inconsistency after the switching.

13. The apparatus according to claim 12, wherein if there exists a plurality of settable contents which solve the inconsistency after the switching, the presentation unit presents the plurality of settable contents and their effects obtained when the settable contents are selected.

14. The apparatus according to claim 12, wherein if the settable content which solves the inconsistency exists in a use history, the presentation unit presents the settable content in the use history.

15. The apparatus according to claim 12, wherein if the settable content which solves the inconsistency does not exist after the switching, and another image output apparatus different from the image output apparatus before and after the switching has the settable content which solves the inconsistency, the presentation unit presents said another image output apparatus as a candidate of a new switching destination.

* * * * *